Oct. 28, 1969     K. J. STEINKAMP ET AL     3,475,061
PROTECTIVE DEVICE

Filed Feb. 3, 1967

INVENTORS
KEITH J. STEINKAMP
BRANT TERZIC

BY Anderson, Luedeka, Fitch, Even & Tabin ATTORNEYS

United States Patent Office 3,475,061
Patented Oct. 28, 1969

3,475,061
PROTECTIVE DEVICE
Keith J. Steinkamp, Warrenville, and Brant Terzic, Chicago, Ill., assignors, by mesne assignments, to KW Battery Company, Skokie, Ill., a corporation of Delaware
Filed Feb. 3, 1967, Ser. No. 613,860
Int. Cl. H01h 83/10, 83/12; H02h 3/24
U.S. Cl. 307—130   6 Claims

ABSTRACT OF THE DISCLOSURE

The disclosed protective device is used with a battery-powered vehicle and includes a low voltage sensing means which is connected to the terminals of a storage battery of the vehicle so as to sense the voltage of the battery. When the battery voltage drops below a preselected minimum value, the sensing means energizes an indicating means which informs the operator of the vehicle that he should stop what he is doing and return to the charging station for a recharge or a substitute battery. If the operator does not correct the low voltage condition in a predetermined time interval, the voltage sensing means actuates a disabling means which disables an operational function of the vehicle.

---

This invention relates to a protective device for storage battery-powered apparatus and more particularly to a protective device for a battery-powered vehicle which prevents overdischarge of the motive-power battery.

There are various types of vehicles which are powered by storage batteries. Industrial lift trucks are a prime example of such vehicles. Such vehicles should return to a charging station for recharging of the battery or the substitution of a recharged battery when the same becomes discharged. Otherwise the battery may become damaged. Moreover, the vehicle motors supplied by the battery draw more current when the battery voltage is low, which current could exceed the rating of the motors and/or contacts associated therewith and thereby result in costly damage. Also, without power, the load being manipulated by the vehicle may be left in a dangerous position and/or the vehicle may require a tow back to the charging station. However, it is often difficult to alert the vehicle operator to the approach of the overdischarged condition and also to convince him to leave the immediate job he is doing to return to the charging station for a recharge or a substitute battery.

It is an object of the present invention to provide a protective device which will prevent overdischarge of storage batteries. It is another object to provide a protective device which provides a warning to an operator when a certain discharge condition is reached so that overdischarge of a storage battery may be avoided. It is a further object to provide a protective device designed for use with battery-powered vehicles which indicates a low-voltage condition with ample time remaining for the vehicle operator to return to the charging station before overdischarge occurs. Still another object is to provide a protective device for use with a battery-powered industrial lift truck which, upon occurrence of a preselected discharge condition of the battery, indicates the low voltage condition and at the conclusion of a predetermined time period disables the lift mechanism drive so as to necessitate the operator's return to the charging station.

Figure 1:
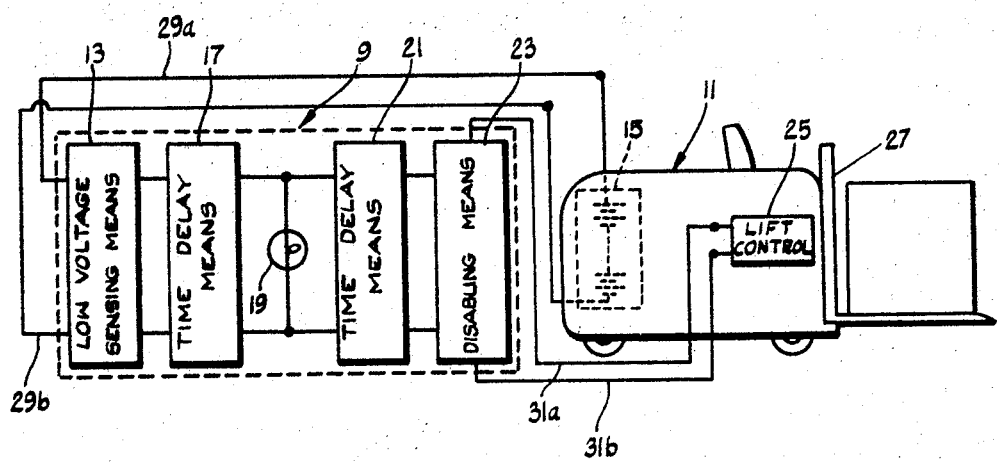
Figure 2:
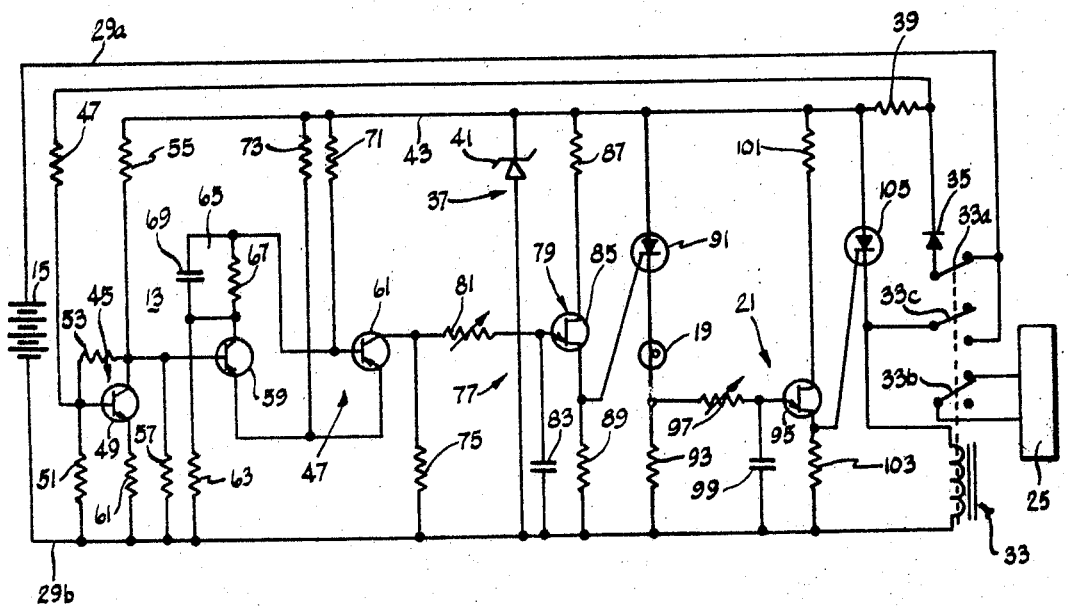

These and other objects of the invention are more specifically set forth in the following detailed description and in the accompanying drawings wherein:

FIGURE 1 is a diagrammatic view of a protective device embodying various features of the present invention in combination with an industrial lift truck and its motive-power storage battery; and FIGURE 2 is an electrical schematic of the protective circuit illustrated in the embodiment of FIGURE 1.

Briefly, the protective device 9 illustrated in FIGURE 1 is used with a battery-powered vehicle 11, such as a lift truck. The protective device 9 includes a low voltage sensing means 13 which is connected to the terminals of a storage battery 15 of the vehicle so as to sense the voltage of the battery. When the battery voltage drops below a preselected minimum value, the sensing means 13 energizes a time delay means 17 (hereinafter referred to as the first time delay means) which, if the voltage remains below the minimum value for a predetermined time, energizes an indicating means 19. The operator can then stop what he is doing and return to the charging station for a recharge or a substitute battery. If the operator does not correct the low voltage condition in a predetermined time interval, another time delay means 21 (hereinafter referred to as the second time delay means) which is coupled to the first time delay means 17, actuates a disabling means 23 which disables an operational function of the vehicle.

More particularly, as shown in FIGURE 1, the protective device 9 is employed with the industrial lift truck 11. The protective device 9, however, may be employed with any storage battery-powered vehicle, where it is important to prevent overdischarge of the battery. The truck 11 is depicted as incorporating the storage battery 15 and a control box 25 for operating an electrohydraulic or electromechanical lift mechanism 27. The protective device 9 is also carried by the truck 11 even though, for purposes of illustration, it is shown separated from the vehicle.

The protective device 9 is connected via leads 29a and 29b to the negative and positive terminals, respectively, of the storage battery 15 and by leads 31a and 31b to the lift control box 25. As shown in FIGURE 2, the positive terminal of the battery is connected through a normally closed pair of contacts 33a of a relay 33 and through a polarity reversal protecting diode 35 to a voltage regulation circuit 37. The voltage regulation circuit 37 includes the series combination of a dropping resistor 39 and a Zener diode 41, the anode of which is connected to the negative lead 29b. The common junction of the resistor and Zener diode combination serves as a regulated voltage bus 43 for the protective circuit.

A drop in battery voltage below a predetermined low level is sensed by the sensing means 13 which can be any circuit which provides a time delay actuating signal when the input signal thereto is below the predetermined low level and a non-actuating signal when the input signal is above the predetermined level. The sensing means 13, illustrated in FIGURE 2, includes a signal inverter 45 connected to a Schmitt trigger circuit 47. Serving to couple the battery voltage to the signal inverter 45 is an input coupling resistor 47, one terminal of which is connected to the cathode of the steering diode 35 and the other terminal of which is connected to the base of an NPN inverter transistor 49. Providing bias to the base of the transistor 49 are biasing resistors 51 and 53. The resistor 51 is connected between the base and the negative lead 29b, and the resistor 53 is connected between the collector and the base. Collector voltage is supplied to the transistor 49 by means of a series voltage dropping network including resistors 55 and 57 respectively connected between the regulated voltage bus 43 and the negative lead 29b. The common junction of the resistors 55 and 57 is connected to the collector of the inverter transistor 49 and to the base of an input PNP transistor 59 of the Schmitt trigger circuit 47. The emitter of the transistor is connected to one terminal of a biasing resistor 61, the remaining terminal of which is connected to the negative lead 29b.

Under normal battery conditions, the inverter transistor 49 is biased to maintain operation in or near its saturated region thereby providing a relatively low voltage between its collector and ground. Should the battery voltage decrease, such as would be the case with operation under heavy load or operation with an excessively discharged battery, the biasing voltage at the base of the inverter transistor 49 decreases thereby causing an increase in the transistor collector voltage.

As previously mentioned, the collector of the inverter transistor 49 is connected to the base of the input transistor 59 of the Schmitt trigger circuit 47 which transistor, for normal battery voltage, is in its saturated condition. A biasing resistor 63 is connected between the collector of the input transistor 59 and the negative lead 29b and the collector is also coupled through one terminal of a coupling network 65 to the base of an output PNP transistor 61. The coupling network consists of a resistor 67 and a capacitor 69 in parallel connection. Biasing voltage is supplied to the base of the output transistor 61 through a biasing resistor 71 connected to the regulated voltage bus 43. The emitters of the transistors 59 and 61 are commonly connected to one terminal of a resistor 73, the remaining terminal of which is connected to the voltage regulated bus 43. The collector of the output transistor 61 is connected through a load resistor 75 to the negative lead 29b.

The predetermined low level of the battery voltage which causes switching of the Schmitt trigger circuit 47 is chosen in accordance with the particular characteristics of the cells of the battery being employed on the vehicle 11. For example, with certain lead-acid industrial batteries, which have a rated voltage of about two volts per cell, it is considered desirable not to discharge the battery below an average open circuit cell voltage of about 1.95 volts, both for protection of the battery and protection of certain electrical components of the system being operated thereby. Other industrial batteries which have a rated voltage of about 1.7 volts per cell, should not be discharged below an open circuit cell voltage of about 1.5 volts.

The illustrated sensing means 13 actuates the time delay means which, in turn, actuates the indicating means 19. The primary purpose of the first time delay means 17 is to prevent the actuation of the indicating means 19 during periods when the voltage of the battery 15 drops below the predetermined low level as a result of the performance of a strenuous task or heavy lifting operation. As a result of the inclusion of the first delay means, there will be no indication to the operator until a true low-voltage discharge condition has actually occurred. This arrangement avoids any on-off operation of indicating means 19 which might distract a vehicle operator or annoy him to the point that he would cause himself to ignore the indicating means 19 and thus not recognize the signal when the true warning period did actually occur. It should be understood that the protective device 9 may be made and operated without the first time delay circuit 17 if the occasional on-off operation of the indicating means 19 is not objectionable. In such an instance, the indicating means will be energized directly by the low voltage sensing means 13 and the operator will be warned that the disabling operation is about to occur when the on-off operation ceases and the indicating means 19 stays on steadily.

As shown in FIGURE 2, the first time delay means 17 includes a resistance-capacitance delay circuit 77 which "fires" a unijunction transistor circuit 79. The collector voltage of the output transistor 61 of the Schmitt trigger circuit 47 is coupled through a series resistor 81 and capacitor 83 which form the delay circuit 77. The junction of the capacitor 83 and resistor 81 is coupled to the emitter of a unijunction transistor 85 forming a portion of the unijunction transistor circuit 79. Each of the bases of the unijunction transistor 85 are coupled respectively through biasing resistors 87 and 89 to the regulated voltage bus 43 and to the negative lead 29b. As previously mentioned, a decrease in the battery voltage below the predetermined low level causes the Schmitt trigger circuit 47 to switch thereby providing an increased voltage at the collector of the output transistor 61 which is coupled through the variable resistor 81 and serves to charge the time delay capacitor 83.

During the vehicle lifting operation, the battery voltage normally decreases due to the internal resistance of the battery. However, a well charged battery rapidly returns to normal output voltage and thus the low voltage condition prevails only for a short period of time. In those situations where the battery 15 is not adequately charged, this low voltage condition persists for a considerable period after removal of the load. The values of the variable resistor 81 and capacitor 83 are so selected that the charge across the capacitor 83 reaches the "firing" potential of the unijunction transistor 85 only if the battery voltage remains excessively low for a considerable predetermined period of time. The failure of the battery 15 to return rapidly to its full voltage is indicative of an undercharged condition.

For a protective device designed for use with an industrial lift truck, the time delay period is selected so as to be longer than any normal lifting period. A delay of three minutes is considered sufficient. Thus, when a heavy workload reaches its raised position, the output voltage of the storage battery 15, which is no longer powering the lift mechanism 27, rebounds to a value above the predetermined low level if the storage battery 15 is not truly in a low-voltage condition. As soon as the return to an open circuit voltage above the low level is sensed, the voltage sensing means 13 de-energizes the first time delay means 17. The time delay period begins to run anew as soon as a low voltage level condition is again sensed.

When the charge upon the capacitor reaches the "firing" potential, the unijunction transistor 85 is caused to conduct thereby increasing the voltage at the common connection of the transistor base and the grounded biasing resistor 89. This increased voltage is coupled to the gate of a silicon controlled rectifier 91. The anode of the rectifier 91 is connected to the regulated voltage bus 43 and the cathode is connected to one terminal of the indicating means 19, which may be a red light at a location visible to the operator. Other types of indicating means may be employed, such as a horn, siren, etc. The remaining terminal of the indicating means 19 is connected through a current limiting resistor 93 to the negative lead 29b. Conduction of the unijunction transistor 85 causes the silicon controlled rectifier 91 to be switched into its conductive state thereby energizing the indicating means 19 so as to provide an indication to the operator that the battery charge has fallen below a safe value. Once the silicon controlled recifier 91 has been switched on, it will remain in its conductive state regardless of the output voltage of the battery.

In the illustrated embodiment, the second time delay means 21 is actuated simultaneously with the indicating means 19 and runs for a second predetermined time delay period regardless of any subsequent fluctuations of the output voltage of the storage battery 15. At the end of the second time delay period, the second time delay means actuates the disabling device 23. The disabling device opens the power circuit to the vehicle lift control 25 and thereby prevents further lifting of a workload until the vehicle 11 is returned to the charging station and the battery is recharged or a fresh battery is obtained. The second time delay period is predetermined to equal the time, such as three minutes, in which it is expected that any further lifting of a load may be accomplished which is needed to permit a safe interruption of the task at hand. If desired, a safety switch (not shown) having a thermal cut out may be connected so as to actuate the lift control 25 in case of emergencies. The main drive motor of the vehicle is not affected so that the operator, who now finds his lifting capacity gone, is obliged to promptly return to the charging station and obtain a recharge or a substitute battery, before overdischarge of his battery occurs.

As shown in FIGURE 2, the second time delay means 21 includes a relay control unijunction transistor 95, the emitter of which is connected through a variable resistor 97 to the common junction of the indicating means 19 and the limiting resistor 93. Connected between the emitter of the unijunction transistor 95 and ground, is a time delay capacitor 99. The values of the resistor 97 and the capacitor 99 are so selected that the charge across the capacitor 99 reaches a value sufficient to cause the unijunction transistor 95 to conduct upon expiration of the second predetermined time period. One base of the unijunction transistor 95 is connected through a biasing resistor 101 to the regulated voltage bus 43 and the remaining base is connected through a second biasing resistor 103 to the negative lead 29b. The common junction of the resistor 103 and the base of the unijunction transistor 95 is connected to the gate of a silicon controlled rectifier 105. The anode of the silicon controlled rectifier 105 is connected to the regulated voltage bus 43 and the cathode thereof to one terminal of the coil of the relay 33, the remaining terminal of which is connected to the negative lead 29b.

Simultaneously with the energizing of the indicating means 19, the time delay capacitor 99 commences to slow charge through the resistor 97. Upon the attainment of a predetermined charge upon the capacitor 99, the unijunction transistor 95 is caused to conduct, thereby raising the voltage at the gate of the rectifier 105 and thus causing it to conduct and actuate the relay 33. Upon actuation of the relay 33, a pair of normally closed lift control contacts 33b which are connected to the lift control 25 are opened disabling the lift control 25. The contacts 33a are also opened thereby removing power from the protective circuit 9. Removal of power from the protective circuit 9 allows each of the time delay capacitors 83 and 99 to discharge through the inherent circuit resistance and also allows the silicon controlled rectifiers 91 and 105 to reset. The relay 33 also includes a set of normally opened contacts 33c. The movable contact of this set is connected to the common junction of the relay 33 and the cathode of the silicon controlled rectifier 105 and the fixed contact is connected to the positive terminal of the battery 15. Upon actuation of the relay 33, the contacts 33c hold in the relay 33.

Briefly, the signal inverter 45 and the Schmitt trigger circuit 47 cooperate to sense the voltage of the battery 15. A decrease in the battery voltage below the predetermined low level causes the output transistor 61 of the Schmitt trigger circuit 47 to be rendered nonconductive thereby providing an increased positive voltage through the resistor 81 for charging of the indicating means delay capacitor 83. Should the battery voltage remain at such a low voltage for a period of time sufficient for the charge upon the capacitor 83 to obtain a predetermined value, the unijunction transistor 85 conducts thereby switching on the silicon controlled rectifier 91 thus energizing the indicating means 19 so as to provide a suitable indication to the operator. This indication informs the operator that the battery charge has dropped below the safe level and further that after the expiration of a short period of time, the lift control 25 of the vehicle will be disabled. Upon expiration of this short period of time, the silicon controlled rectifier 105 is switched on thereby energizing the relay 33 which is held in its energized state by the hold contacts 33c thereof. Actuation of the relay 33 disables the lift control 25 and removes power from the protective circuit 9.

It is believed that the invention provides a simple and very reliable protective device for preventing the overdischarge of a storage battery. It is believed that use of the protective device not only increases the lifetime of a storage battery, but also significantly reduces the maintenance cost for the electrical system of the apparatus being powered by the battery.

Various embodiments other than those illustrated herein will become apparent to those skilled in the art from the foregoing discussion and accompanying drawings. Such other embodiments and modifications thereof are intended to fall within the scope of the appended claims.

What is claimed is:

1. A protective device for use with storage battery-powered apparatus, which device comprises means for sensing a low voltage condition of a storage battery, means for completing a connection between said sensing means and terminals of the storage battery of the apparatus, means for disabling a power function of the apparatus, time delay means connected between said sensing means and said disabling means for delaying operation of said disabling means for a predetermined time interval, and indicating means responsive to operation of said sensing means for indicating said low voltage condition prior to the operation of said disabling means, said time delay means including means connected between said sensing means and said indicating means for delaying the actuation of said indicating means for a predetermined time shorter than said time interval.

2. A protective device in accordance with claim 1 wherein said time delay means includes a first time delay means coupled to said indicating means for actuation of the same after a predetermined time interval, and a second time delay means actuated by said first time delay means and coupled to said disabling means for actuation of the same after a predetermined time interval.

3. A protective device in accordance with claim 2 wherein said voltage-sensing means resets said first delay means when said battery exceeds said low voltage condition.

4. In combination with an electric powered lift vehicle, a storage battery, and a lift mechanism drive, a protective device comprising means for sensing a low voltage condition of the storage battery, means for completing a connection between said sensing means and the terminals of the storage battery, means for disabling the lift mechanism of the vehicle, time delay means connected between said sensing means and said disabling means for delaying operation of said disabling means for a predetermined time interval, and indicating means connected to said sensing means for indicating said low voltage condition prior to the operation of said disabling means, said time delay means including means connected between said sensing means and said indicating means for delaying the actuation of said indicating means for a preselected time shorter than said time interval.

5. The combination in accordance with claim 4 wherein said time delay means includes a first time delay means coupled to said indicating means for actaution of the same after a predetermined time interval, said first time delay means being deactivated at any time between actuation and completion of said associated predetermined time interval if the voltage sensed by said sensing means exceeds said low voltage condition and a second time delay means actuated by said first time delay means and coupled to said disabling means for actuation of the same after a predetermined time interval.

6. In combination with an electric-powered lift vehicle, a motive-power storage battery, and a lift mechanism, a protective device which comprises means connected to said battery for sensing a low voltage condition of the storage battery, indicating means connected to said sensing means for indicating said low voltage condition, means for disabling said lift mechanism to prevent subsequent lifting of a workload, first time delay means connected between said indicating means and said disabling means for creating, after actuation of said indicating means, a predetermined time delay before operation of said disabling means, and second time delay means connected between said sensing means and said first time delay means to delay for a predetermined time after initial actuation of said sensing means the actuation of said indicating means and said first time delay means.

References Cited

UNITED STATES PATENTS

| | | | |
|---|---|---|---|
| 2,768,336 | 10/1956 | Shoultes et al. | 317—31 X |
| 3,243,658 | 3/1966 | Blackburn | 317—31 |
| 3,343,036 | 9/1967 | Steen | 317—31 |
| 3,349,386 | 10/1967 | Zug | 340—249 |
| 3,389,325 | 6/1968 | Gilbert | 317—31 X |

ROBERT S. MACON, Primary Examiner

T. B. JOIKE, Assistant Examiner

U.S. Cl. X.R.

180—82; 317—31; 320—34, 40, 48; 340—249